March 28, 1961  G. M. BURTON  2,977,149
AIRCRAFT MECHANISM FOR HOLDING AND EJECTING A STORE
Filed Sept. 30, 1955  4 Sheets-Sheet 1
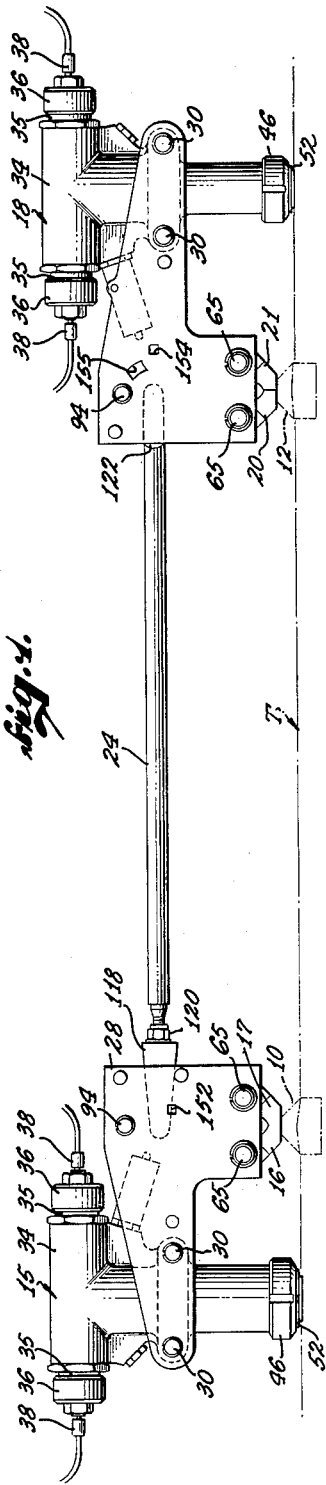
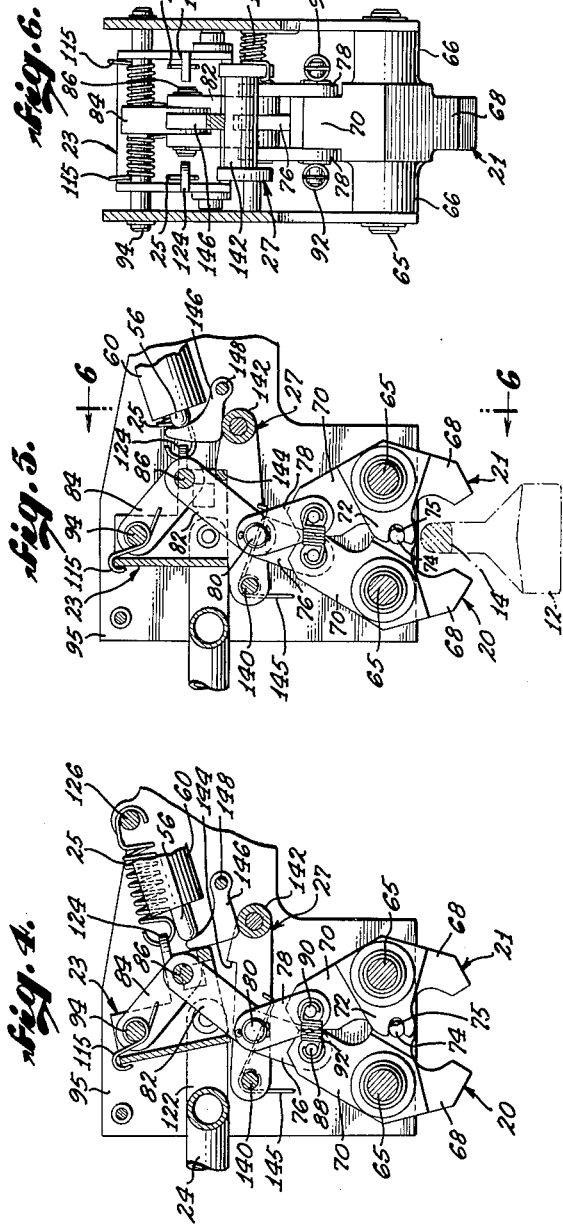
GEORGE M. BURTON,
INVENTOR.
BY *George V. Smyth*
ATTORNEY.

March 28, 1961 G. M. BURTON 2,977,149
AIRCRAFT MECHANISM FOR HOLDING AND EJECTING A STORE
Filed Sept. 30, 1955 4 Sheets-Sheet 2
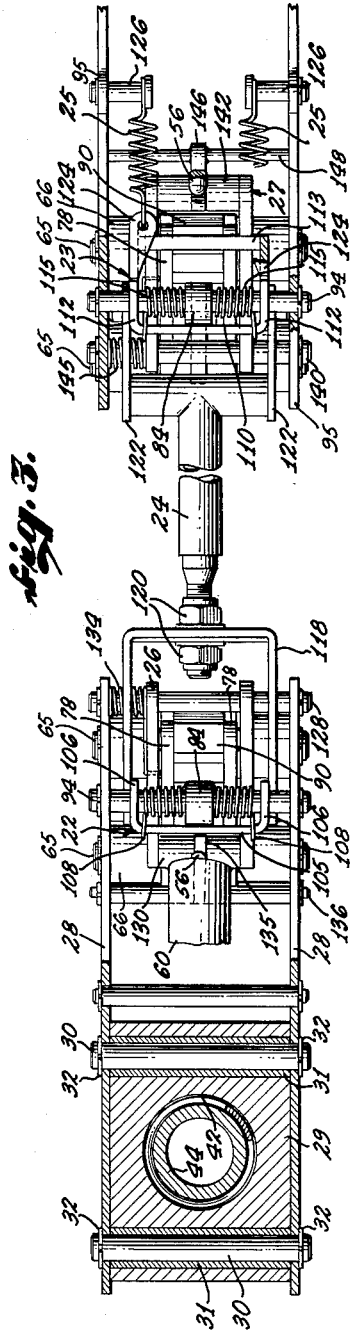
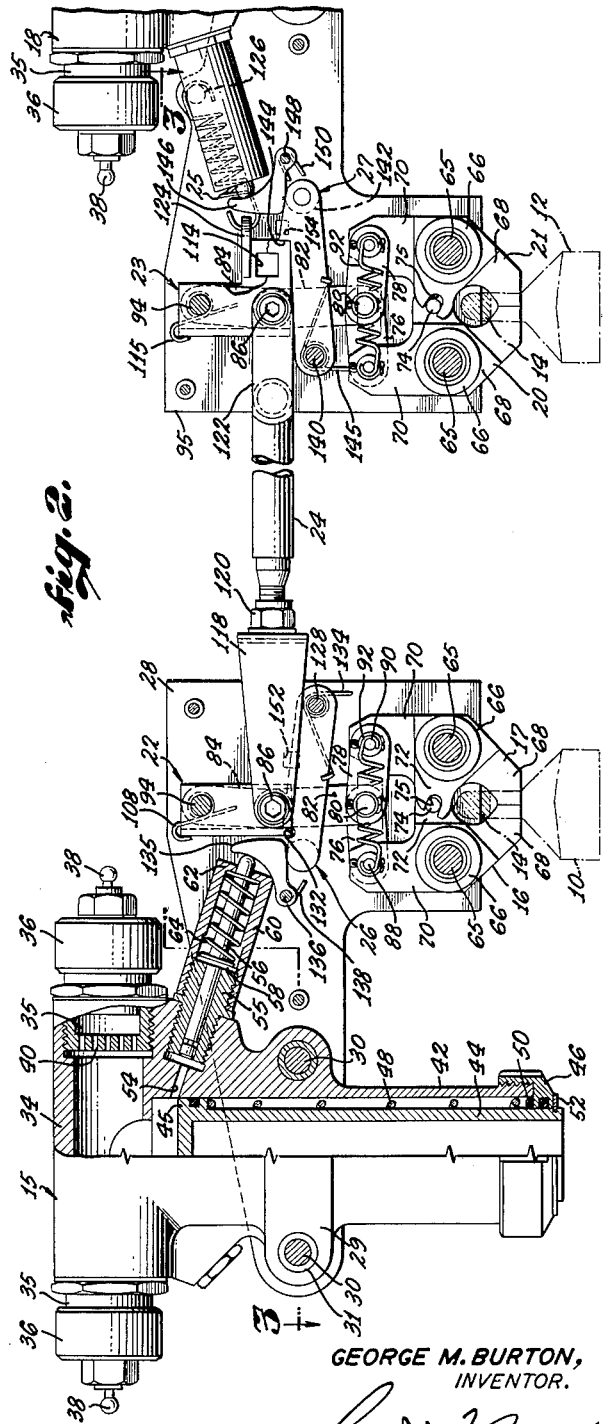
GEORGE M. BURTON,
INVENTOR.
BY *George V. Smyth*
ATTORNEY.

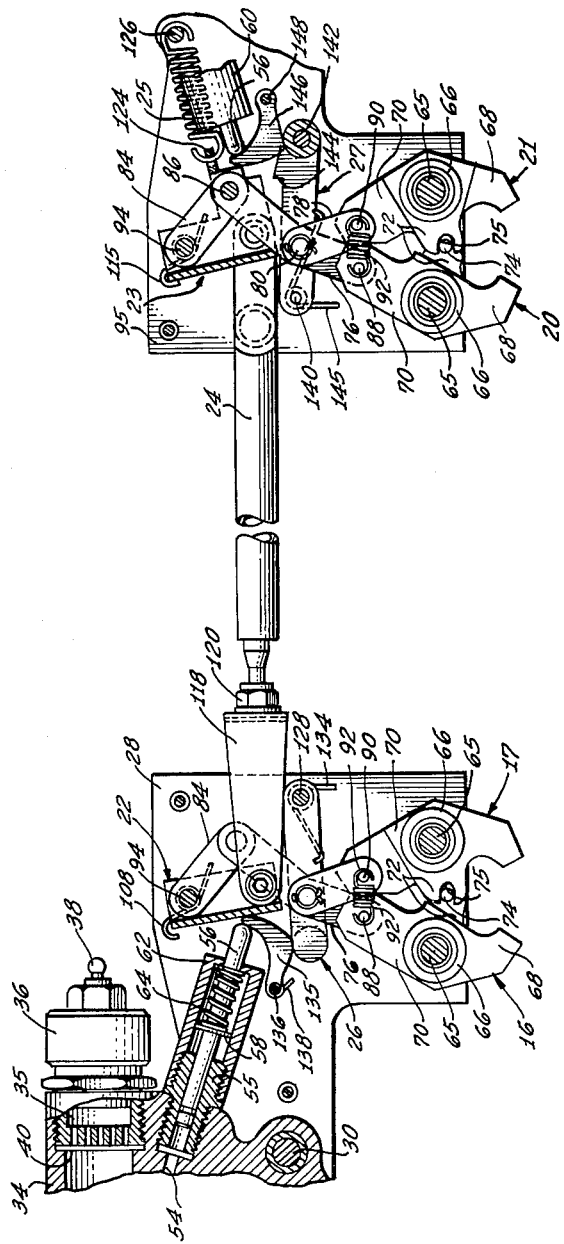

March 28, 1961 G. M. BURTON 2,977,149
AIRCRAFT MECHANISM FOR HOLDING AND EJECTING A STORE
Filed Sept. 30, 1955 4 Sheets-Sheet 4
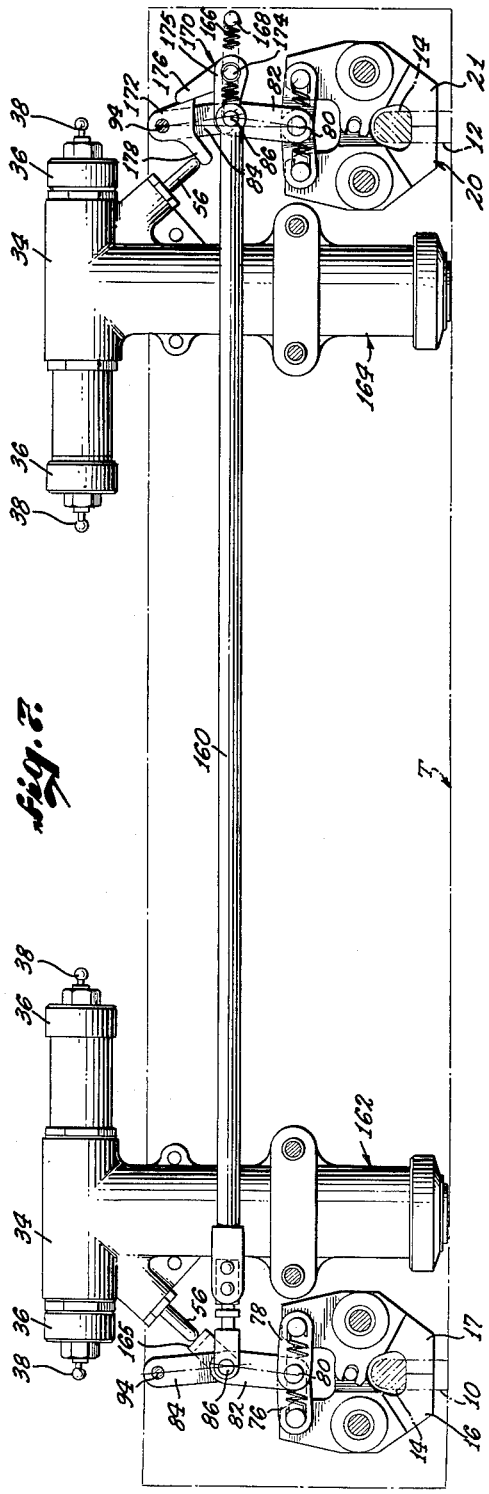
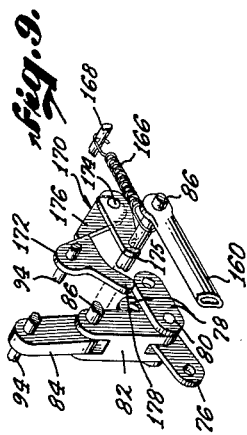
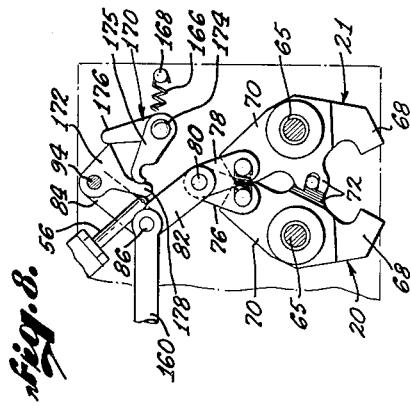
GEORGE M. BURTON,
INVENTOR.
BY George V. Smyth
ATTORNEY.

United States Patent Office 2,977,149
Patented Mar. 28, 1961

2,977,149

AIRCRAFT MECHANISM FOR HOLDING AND EJECTING A STORE

George M. Burton, Venice, Calif., assignor to Pastushin Aviation Corporation, Los Angeles, Calif., a corporation Filed Sept. 30, 1955, Ser. No. 537,745

16 Claims. (Cl. 294—83)

This invention relates to means for use on an airborne vehicle or aircraft for attaching a store thereto in a releasable manner and for the application of force to eject the released store laterally away from the aircraft.

The invention is directed to a releasable engagement means in the form of jaw means for releasably engaging a shackle of the store and is also directed to various combinations in which two such engagement means engage two spaced shackles of a store and two separate ejectors apply ejective force to the released store at two longitudinally spaced points thereof.

An important feature of the preferred practice of the invention is the provision of releasable engagement means comprising two rotary jaw members with two pairs of toggle links operatively associated therewith. The two jaw members have operating arms integral therewith which are spaced apart when the jaws are closed and which move towards each other to open the jaws. What may be termed a primary pair of toggle links having a central interconnecting pivot joins the two operating arms of the jaws and is in open or expanded position between the two arms when the jaws are closed. What may be termed a secondary pair of toggle arms is operatively connected to the central interconnecting pivot of the primary toggle links. The secondary pair of toggle links is collapsed in one direction to cause collapse of the primary pair of toggle links for opening the jaws and when the jaws are closed the primary pair of toggle links is backed in the opposite direction past center against a stop to lock the jaws shut in an irreversible manner.

With reference to the use of such jaw means in combination with means to apply ejection force to a store, the invention is further directed to such a combination that has special utility for ejecting elongated bodies such as auxiliary fuel tanks from aircraft that fly at supersonic speeds. Such a store is commonly connected to the aircraft by suitable engagement means at two spaced points and is jettisoned by releasing the two engagement means and applying force to a mid-point of the store. The force is commonly generated by igniting an explosive charge in what may be termed an ejector or ejector gun which comprises a combustion chamber, a cylinder in communication with the combustion chamber, and a piston that is slidably mounted in the cylinder to apply the ejective force. Timing of the release of the store relative to the operation of the ejector is accomplished by providing a small auxiliary piston which releases the two engagement means in response to the pressure rise in the combustion chamber.

While such an arrangement is suitable for aircraft flying at ordinary speeds, it is not satisfactory for aircraft flying at supersonic speeds because it cannot be depended upon to thrust the whole length of the fuel tank away from the aircraft with sufficient force and abruptness. Usually the store is given a longitudinal turning movement that causes one of its ends to linger. With the ejective force concentrated at one point, moreover, increasing the explosive force to speed up the departure of the fuel tank may result in the increased energy serving merely to deform or puncture the tank.

The present invention meets these difficulties by employing two ejectors at two longitudinally spaced points of the fuel tank. One advantage, of course, is that the magnitude of the ejective force can be doubled without increased concentration of the force. More important, however, is the assurance that both ends of the auxiliary fuel tank will be thrust from the aircraft effectively and with the desired abruptness.

A new problem arises in carrying out this concept. Since the two ejectors are both far off center with respect to the length of the auxiliary fuel tank, it would be extremely hazardous for one ejector to fail to operate so that only one end of the tank would receive the thrust. At supersonic speeds it would also be extremely hazardous for one of the engagement means to fail to release the auxiliary tank. The invention meets this problem by functionally inter-relating the two ejectors and the two engagement means to prevent both possibilities.

One solution described hereafter consists in making both of the spaced engagement means release in response to the pressure rise in one ejector and in further providing a latch to prevent such release action, this latch being releasable in response to the pressure rise in the other ejector. Thus both ejectors must function to cause either of the two engagement means to release the tank and the two engagement means release together or not at all. If only one ejector operates, the auxiliary fuel tank receives the force therefrom but remains safely in place on the aircraft.

Another solution described hereafter consists in combining the two tank-engaging means into a single mechanism for simultaneous spring-actuated release operation, and in further providing two separate and independent latches to prevent release operation of the mechanism. The two latches release in response to pressure rise in the two combustion chambers, respectively, of the two ejectors. Thus the two engagement means either operate together or not at all and they do not operate unless both ejectors operate.

The features and advantages of the invention will be understood from the following detailed description taken with the accompanying drawings.

Figure 1 is a side elevational view of the first embodiment of the invention as a mechanism for holding and subsequently ejecting an auxiliary fuel tank, the mechanism being shown in its effective or closed position;

Figure 2 is an enlargement of a portion of Figure 1 with some parts shown in section;

Figure 2a is a view similar to Fig. 2 with the mechanism open;

Figure 3 is a plan view of the structure shown in Figure 2 with part shown in section as indicated by the line 3—3 of Figure 2;

Figure 4 is a view partly in side elevation and partly in section showing a portion of the mechanism in open position;

Figure 5 is a similar view with a release member retracted in preparation for closing the mechanism;

Figure 6 is a view of the mechanism in Figure 5 as seen along the line 6—6;

Figure 7 is a side elevational view of the second embodiment of the invention as a mechanism for holding and ejecting an auxiliary fuel tank, the mechanism being shown in its effective or closed position;

Figure 8 is a fragmentary view similar to Figure 7 showing a portion of the mechanism in open position; and

Figure 9 is a perspective view of portions of the mechanism at its closed position.

Figure 1, which illustrates the first embodiment of the invention, shows a mechanism that may be mounted on an airborne vehicle, for example inside the wing or inside a pylon structure of an aircraft, to support a store and to release the store with applied ejection force. In this instance, the store is an auxiliary fuel tank T which is provided with suitable suspension means in the form of forward and aft shackle fittings 10 and 12, respectively. Each of these shackle fittings provides a metal loop 14 (Figures 2 and 5) by means of which the tank may be supported.

The principal parts of the mechanism on the aircraft include: a forward ejector or ejector gun, generally designated 15; a forward engagement means in the form of a pair of jaws 16 and 17 to releasably engage the forward shackle fitting 10; an aft ejector or ejector gun, generally designated 18; an aft engagement means in the form of a second pair of jaws 20 and 21 to releasably engage the aft shackle fitting 12; a forward pivoted release member, generally designated 22, to cause release operation of the forward pair of jaws and an aft release means, generally designated 23, to cause release operation of the aft jaws, these two release means being operatively interconnected by a connecting rod 24 to act in unison; a pair of parallel release springs 25 to actuate the interconnected release members 22 and 23 for simultaneous release operation of the two pairs of jaws; a forward latch, generally designated 26, to engage the forward release means 22 to prevent actuation of both release means, this forward latch means being responsive to operation of the forward ejector gun 15; and an aft latch, generally designated 27, for engagement with the aft release means 23 to prevent operation of both release means, this aft latch being responsive to the aft ejector gun 18.

Since the two ejector guns 15 and 18 are substantially identical, a description of the forward ejector gun too will suffice for both. The forward ejector gun is in the form of a casting mounted between a pair of spaced parallel vertical support plates 28. In the construction shown, an intermediate portion 29 of the gun is enlarged and is of rectangular cross-sectional configuration as shown in Figure 3 to fit between the two support plates 28. A pair of transverse support rods 30 extend through the gun portion 29 and through the two support plates 28. Each of the support rods 30 is encased by a sleeve 31 and is secured in position by split retaining rings 32 at its two ends.

As best shown in Figure 2, the forward ejector gun 15 has a breech 34 into the opposite ends of which are screwed two combustion chambers 35, respectively, and to receive explosive charges in the form of the usual cartridges. The two combustion chambers 35 are provided with removable screw-threaded caps 36 each of which is equipped with the usual ignition means 38 for detonating the explosive charges electrically by remote control. As may be seen in Figure 2, the inner end of each of the combustion chambers is spanned by a perforated wall 40 to confine the burning particles.

The interior of the breech 34 communicates with a downwardly extending cylinder or gun barrel 42 in which a hollow piston 44 is slidingly mounted. The piston 44 which is opened at its bottom end and closed at its upper end, has a radial enlargement 45 at its upper end equipped with a suitable O-ring. The lower end of the piston extends through a bushing 46 on the lower end of the gun barrel 42 and this bushing may have a second O-ring in sealing engagement with the piston. A coiled spring 48 embraces the piston 44 in compression between the gun barrel bushing 46 and the piston enlargement 45 and normally holds the piston in the upper retracted position shown in Figure 2. Preferably a rubber ring 50 is interposed between the bushing 46 and the bottom of the spring to serve as a cushion or bumper. A split ring 52 mounted in a corresponding groove on the bottom end of the piston 44 normally abuts the bushing 46 to limit the upward movement of the piston at the position shown in Figure 2, at which position the piston clears a bore 54.

The bore 54 extends from the upper end of the interior of the gun barrel 42 into an auxiliary cylinder 55 that is threaded into the side of the gun barrel. The auxiliary cylinder 55 encloses a small auxiliary release piston 56 in the form of a relatively long plunger provided with a suitable circumferential O-ring. The auxiliary release piston 56 extends a substantial distance beyond the auxiliary cylinder 55 and is provided with a radial flange 58 which is normally in abutment against the outer end of the auxiliary cylinder. A sleeve 60 that is threaded onto the auxiliary cylinder 55 has an outer end wall 62 through which the end of the auxiliary piston 56 extends. A suitable coiled spring 64 inside the sleeve 60 surrounds the auxiliary release piston 56 in compression between the end wall 62 of the sleeve and the radial flange 58 of the auxiliary piston to hold the auxiliary piston in the normal retracted position shown in Figure 2.

It is apparent that when explosive charges are detonated in the two combustion chambers 35, the resultant high pressure gases exert downward pressure on the ejection piston 44 and when the fluid pressure builds up to substantial magnitude, the auxiliary piston 56 is actuated. A feature that increases the reliability of the mechanism is that either of the two explosive charges in the two combustion chambers is sufficient to actuate the ejection piston 44 and the auxiliary piston 56 in an effective manner. Thus, one of the two charges may fail to detonate without causing failure of operation of the apparatus.

The forward pair of jaws 16 and 17 are pivotally mounted on a pair of spaced cross rods 65 for rotation about the spaced axis thereof, the cross rods being carried by the two support plates 28. As shown in Figure 6, each of the two jaws has a pair of hub portions 66 and, as best shown in Figure 4, the two jaws have downwardly extending hook-shaped arms 68, upwardly extending operating arms 70 and inwardly extending fingers 72. The two fingers 72 interlock and for this purpose one finger has at least one laterally extending lug 74 (Figure 4) which engages a recess 75 in the other finger. When the two jaws 16 and 17 are in open position, a shackle loop 14 may be moved upward against the two fingers 72, as shown in Figure 5, to press against the fingers and thereby rock the two jaws to their closed positions.

Operatively connected to the pair of jaws 16 and 17 is what may be termed a primary pair of toggle links 76 and 78 interconnected by a primary central pivot 80 and what may be termed a secondary pair of toggle links 82 and 84 interconnected by a secondary central pivot 86. The primary toggle link 76 is connected to the operating arm 70 of jaw 20 by a pivot pin 88 and the other primary toggle link 78 is connected to the operating arm 70 of the other jaw 21 by a pivot pin 90. Preferably, the two ends of the pivot pin 88 are connected to the two ends of the pivot pin 90, respectively, by a pair of coiled springs 92 which tend to collapse the primary toggle links 76 and 78. The lower toggle link 82 of the secondary pair of toggle links is connected at its lower end to the primary central pivot 80 and the upper secondary toggle link 84 is mounted at its upper end on a fixed pivot in the form of rod 94 that extends between the two spaced support plates 28.

As may be seen in Figure 6, the primary toggle link 76 comprises a single central link member and the other primary toggle 78 comprises a pair of spaced parallel link members. The secondary toggle link 82 is an H-shaped member which straddles the link 76 and the upper secondary toggle link 84 is a single link member straddled by the upper end of the toggle link 82.

As may be seen in Figure 2, both the primary pair of toggle links 76 and 78 and the secondary pair of toggle links 82 and 84 are in their expanded positions when the two jaws 16 and 17 are closed. At this time the primary central pivot 80 is past centers, i.e., slightly above a line through the axes of the two pivot pins 88 and 90 so that any tendency for the two jaw members 16 and 17 to open thrusts the primary central pivot 80 upward against the expanded secondary pair of toggle links 82 and 84. It will also be noted that the secondary central pivot 86 is also past center, i.e., to the left of a line through the axes of the primary central pivot 80 and the fixed pivot rod 94 so that upward thrust by the primary pair of links 76 and 78 tends to collapse the secondary pair of toggle links 82 and 84 to the left, as viewed in Figures 2, 4 and 5. Thus, it is apparent in Figure 2 that the weight imposed on the pair of jaws 16 and 17 by the shackle loop 14 tends to open the jaws and thus collapse the two pairs of toggle links.

The aft jaws 20 and 21 along with the aft ejector gun 18 are carried by an aft pair of spaced parallel vertical support plates 95. As indicated by the use of corresponding numerals to indicate corresponding parts, the aft pair of jaws 20 and 21 are of the same construction as the forward pair of jaws and in like manner are operatively connected to two pairs of toggle links.

Thus the operating arms 70 of the jaws 20 and 21 which are urged together by a pair of springs 92 are connected to a primary pair of toggle links 76 and 78 having a primary pivot 80 and the primary pair of toggle links is connected to a secondary pair of toggle links 82 and 84 having a secondary central pivot 86. The uppermost secondary toggle link 84 is mounted on a fixed pivot rod 94 as heretofore described.

Associated with the forward secondary pair of toggle links 82 and 84 is the previously mentioned forward release member 22 which may be actuated to cause collapse of the toggle links and in like manner associated with the aft pair of secondary toggle links 82 and 84 is the previously mentioned release member 23. The forward release member 22 may be made of a piece of sheet metal forming a central transverse web 105 and two side flanges 106. By means of the two side flanges 106 the forward release member 22 is pivotally mounted on the previously mentioned fixed pivot rod 94 that carries the upper secondary toggle link 84. With the forward release member 22 and the forward secondary toggle links 82 and 84 in the positions shown in Figure 2, and with the central web 105 of the release member positioned for actuating contact with the upper toggle link 84 it is apparent that the forward release member may be rotated counter-clockwise about the fixed pivot rod 94 to move the forward secondary toggle links 82 and 84 rightward for collapse of the two pairs of toggle links with consequent opening of the jaws 16 and 17. Preferably, a pair of torque springs 108 are wound on the fixed pivot rod 94 on opposite sides of the secondary toggle link 84 with one end of each spring hooked over the web 105 of the release member 22 and the other end connected to the toggle link 84 to tend to draw the release member and the toggle link together and thereby tend to expand the secondary toggle links when the parts are positioned as shown in Figure 5.

The aft release member 23 is of the same general construction as the forward release member, being formed with a central transverse web 110 and a pair of side flanges 112. In this instance, however, the side flanges 112 are extended and are interconnected by a lower transverse strap 113 (Figure 3). In addition at least one of the side flanges 112 is provided with a square opening 114 to receive a suitable tool (not shown) of square cross section for manual rotation of the latch member about the fixed pivot rod 94. Here again, a torque spring 115 tends to draw the aft release member 23 and the associating secondary toggle links 82 and 84 together.

As heretofore stated, the two release members 22 and 23 are interlocked by a connecting rod 24 for synchronous movement. In the construction shown, a U-shaped yoke 118 is mounted on one end of the connecting rod by a pair of nuts 120 and has its two arms pivotally connected to the forward release member 22. The other end of the connecting rod 24 is T-shaped and is provided with a pair of arms 122 for connection with the aft release member 23.

The two side flanges 112 of the aft release member 23 may be formed with ears 124 for connection respectively with the previously mentioned pair of release springs 25. The other ends of the two springs 25 are connected to suitable studs 126 on the aft pair of support plates 95.

The previously mentioned forward latch 26 is pivotally mounted on a cross rod 128 carried by the forward support plates 28 and comprises a pair of forwardly extending spaced arms interconnected at their forward ends by a cross member 130. Each of the two arms has a latching recess 132 on its upper side for latching engagement with the lower edge of the web 105 of the forward release member 22. The latch 26 is urged to its latching position by a suitable torque spring 134 which is wrapped around the cross rod 128 with one end of the spring engaging the underside of the latch and with the other end of the spring anchored to one of the vertical support plates 28.

This forward latch 26 is made releasable in response to the previously mentioned auxiliary piston 56 by means of a rocker member 135 that is pivotally mounted on a fixed cross rod 136. The rocker member 135 is normally in abutment with the auxiliary piston 56 on one side and is in abutment with the cross member 130 of the latch 26 on its other side, so that outward movement of the auxiliary piston 56 in response to a rise of fluid pressure in the ejector gun 15 rotates the rocker member clockwise as viewed in Figure 2 and thereby swings the latch 26 downward out of engagement with the forward release member 22. Preferably, a small torque spring 138 urges the rocker member 135 counterclockwise towards its normal position in contact with the retracted auxiliary piston 56, as shown in Figure 2.

The aft latch 27 is of similar construction and comprises a pair of arms mounted on a fixed cross rod 140, the swinging ends of the two arms being interconnected by a cross member 142. The two arms of the latch 27 are formed with latching shoulders 144 for engagement with the previously mentioned cross strap 113 of the aft release member 104 to prevent release operation of the release member. A suitable torque spring 145 urges the latch member 27 clockwise towards its effective or latching position. Here again a suitable rocker member 146 on a fixed cross rod 148 is interposed between the latch 27 and the aft auxiliary piston 56, the rocker member being biased by a suitable torque spring 150.

Preferably, a small aperture 152 is provided in one of the forward support plates 28 to make the forward latch 26 accessible therethrough for manual release by a suitable tool such as a screw driver, and in like manner at least one of the rear vertical support plates 95 is provided with a similar aperture 154 to permit manual release of the aft latch 27. In addition, at least one of the two vertical support plates 95 is provided with a larger aperture 155 (Figure 1) through which a tool of square cross section may be manipulated to enter the square aperture 114 of the aft release member 23 for manual actuation of both of the release members.

The manner in which this first embodiment of the invention operates to serve its purpose may be understood from the foregoing description. With the two ejector guns 15 and 18 loaded with explosives and with the two pairs of jaws and their associated mechanisms in their release positions as indicated in Figure 4, the two interconnected release members 22 and 23 are first cocked in preparation for insertion of the two shackle fittings 10 and 12 into the two pairs of jaws. The cocking operation is carried out by inserting a tool of square cross section such as square bar through the support plate aperture 155 into the square aperture 114 of the aft release member 104. Clockwise rotation of the tool causes clockwise rotation of the aft release member 23 from the released position shown in Figure 4 to the cocked or latched position shown in Figure 5 in opposition to the two release springs 25. Since the two release members 22 and 23 are operatively interconnected by the connecting rod 24, the forward release member 22 is moved to its cocked or latched position in unison with the aft release member 23. As the two release members 22 and 23 make these clockwise movements, they swing against the two corresponding latches 26 and 27 which latches automatically latch the two release members.

At this point, each of the two pairs of jaws and their associated mechanisms are positioned as shown in Figure 5 with the corresponding release members in latched positions. The auxiliary fuel tank T is then maneuvered to introduce the forward shackle fitting 10 into the open forward pair of jaws 16 and 17 and to introduce the aft shackle fitting 12 into the open aft pair of jaws 20 and 21. As the shackle loop 14 of each shackle fitting moves against the fingers 72 of the corresponding pair of jaws, the fingers are displaced upward to cause the jaws to close. Thus each of the pairs of jaws may be closed independently of the other when the two release members 22 and 23 are cocked. When a shackle loop 14 moves upward against a pair of jaw fingers 72 to close the jaws, the corresponding primary pair of toggle links 76 and 78 is expanded to cause corresponding expansion of the associated secondary pair of toggle links 82 and 84. As the secondary pair of toggle links 82 and 84 approach their expanded position, they are snapped to the left past center, the snap action of the forward secondary toggle links being caused by the torque spring 108 and the snap action of the aft pair of secondary toggle links being caused by the torque spring 115. These two torque springs 108 and 115 are ineffective so long as they are opposed by the springs 92 that act on the operating arms of the two pairs of jaws.

Since the torque springs 108 and 115 snap the two pairs of secondary toggle links 82 and 84 past center against the webs of the corresponding latched release members 22 and 23, the tendency of the expanded secondary links to collapse in response to the weight imposed by the shackle loops 114 and in response to the springs 92 is in the direction opposite from the direction of force exerted by the pair of release springs 25 and is blocked in a positive manner by the forward release member 22 which in turn is blocked by the rocker member 135.

When the moment arrives for jettisoning the auxiliary fuel tank T the explosive charges in the two ejector guns 15 and 18 are detonated by remote control from the cabin of the aircraft and pressure builds up abruptly in the two ejector guns. When the pressure rise reaches a substantial magnitude, the two auxiliary release pistons 56 of the two ejector guns are actuated. The auxiliary release piston of the forward gun acting through the forward rocker member 135 disengages the forward latch 26 from the forward release member 22 and the auxiliary release piston of the aft ejector gun disengages the aft latch 27 from the aft release member 23 by means of the rocker member 146.

With both of the latches 26 and 27 disengaged from the two release members 22 and 23, the two release members are free to swing rearward in response to the force exerted by the two release springs 25. The counter-clockwise release rotation of the two release members 22 and 23 causes the two pairs of secondary toggle links to collapse to the right as viewed in Figure 2 and consequently causes the two pairs of primary toggle links 76 and 78 to collapse upward, this collapsing action being apparent in Figure 4.

It can be seen that since the two release members 22 and 23 are interconnected by the connecting rod 24, the two pairs of jaws will be opened simultaneously or not at all, there being no possibility of one pair of jaws opening with the other pair of jaws remaining closed.

It is further apparent that both of the ejector guns 15 and 18 must operate to cause opening of the two pairs of jaws. Thus if only the forward ejector gun 15 operates the aft latch 27 remains effective to prevent release operation of the two pairs of jaws and, conversely, if only the aft ejector gun 18 operates, the forward latch 26 remains effective to prevent opening of the two pairs of jaws. Thus the auxiliary fuel tank T is released by the two pairs of jaws only if both of the ejector guns are effective for exerting ejection force against the auxiliary fuel tank at the two spaced points of the auxiliary fuel tank to insure effective thrust of the fuel tank away from the aricraft.

The second embodiment of the invention shown in Figure 7 includes the usual forward pair of jaws 16 and 17 to engage the forward shackle fitting 10 and the usual aft pair of jaws 20 and 21 to engage the aft shackle fitting 12. Each of the two pairs of jaws is of the construction heretofore described and each pair of jaws is operatively connected to a pair of primary toggle links 76 and 78 and a pair of secondary toggle links 82 and 84, the primary toggle links having the usual primary central pivot 80 and the secondary toggle link having the usual secondary central pivot 86. As heretofore described, the uppermost secondary toggle link 84 is mounted on a fixed transverse pivot rod 94.

In this instance, the forward pair of jaws and the aft pair of jaws are directly interconnected for simultaneous operation and for this purpose a pair of parallel connecting rods 160 may be provided. The two connecting rods 160 are connected to the opposite ends of the secondary central pivot 86 of the forward toggle linkage and are connected to the opposite ends of the secondary central pivot 86 of the aft toggle linkage.

This second embodiment of the invention includes a forward ejector gun 162 and an aft ejector gun 164. These two ejector guns are of the same general construction described heretofore, as indicated by the use of corresponding numerals to indicate corresponding parts. Each of the ejector guns has the usual downwardly inclined auxiliary release piston 56. It is contemplated that the two pairs of interlocked jaws will be actuated for release operation by the auxiliary release piston 56 of the forward ejector gun 162 and that the two pairs of interlocked jaws will be normally locked against release operation by a suitable latch that is responsive to the auxiliary release piston 56 of the aft ejector gun 164.

As shown in Figure 7, the two pairs of interlocked jaws may be made responsive to the auxiliary release piston 56 of the forward ejector gun 162 by means of an operating member 165 that is unitary with the forward secondary toggle link 84 and is positioned at an acute angle relative thereto. Preferably a suitable spring means is provided to position the interlocked toggle mechanism with the operating member 165 backed against the forward auxiliary release piston 56. Thus, as shown in Figures 7 and 9, at least one coiled spring 166 may be connected at one end to a fixed cross rod 168 and may be connected at the other end to the secondary central pivot 86 of the aft secondary toggle links.

It is to be noted that in the normal position of the mechanism shown in Figure 7, each of the secondary pairs of toggle links 82 and 84 are swung rearwardly past center with each of the secondary central pivots 86 rearward of a line through the axis of the fixed pivot rod 94 and the axis of the primary central pivot 80. By virtue of this arrangement, any tendency for the two pairs of jaws to open is blocked in a positive manner since such tendency merely results in pressure by the operating member 165 against the retracted forward release piston 56, the retracted release piston serving as a stop.

The latch means responsive to the release piston 56 of the aft ejector gun 164 may comprise a bell crank 170 and an associated rocker member 172. The bell crank 170, which is mounted on a fixed transverse pivot rod 174, has a lower hook-shaped latch arm 175 for latching engagement with the aft secondary central pivot 86 and has an upper operating arm 176 that rests against the rocker member 172, the rocker member being mounted on the previously mentioned fixed pivot rod 94. The rocker member 172 has an operating finger 178 in abutment against the release piston 56 of the aft ejector 164. With the parts positioned as shown in Figure 7, downward extension of the aft release piston 56 rocks the rocker member 172 counter-clockwise to cause clockwise rotation of the bell crank 170, whereby the hook-shaped latch arm 175 is lifted out of engagement with the aft secondary central pivot 86.

The two pairs of jaws of the second embodiment of the invention may be opened to receive the loops 14 of the shackle fitting by manually shifting the connecting rods 160 to the left, as viewed in Figure 7, in opposition to the spring 166, the latch arm 175 being disengaged from the secondary central pivot 86 to make this shift possible. When the two shackle loops 14 are moved into the jaws against the jaw fingers 72, the jaws close and the closing action is assisted by the spring 166 which acts to throw the two pairs of secondary toggle links back to their normal rightward past-center positions. In this return movement, the latch arm 175 is first cammed upward by the secondary central pivot and then engages the pivot.

When the time arrives to jettison the auxiliary fuel tank T, the explosive charges in the two ejector guns 162 and 164 are detonated in the usual manner. The pressure rise in the aft ejector gun 164 actuates the latch arm 175 to unlatch the interlocked toggle mechanism for release operation and the pressure rise in the forward ejector gun 162 thrusting the forward release piston 56 against the operating member 165 provides the actuating force to collapse the two pairs of secondary toggle links leftward for release operation of the two pairs of jaws.

It is apparent that in the operation of this second embodiment of the invention, as in the operation of the first embodiment, the two pairs of jaws open together or not at all and it is further apparent that the two pairs of jaws will not operate unless both of the ejector guns operate.

My description in specific detail of the selected embodiments of the invention will suggest to those skilled in the art various changes, substitutions and other departures from my disclosure that properly lie within the spirit and scope of the appended claims.

I claim:

1. In an apparatus for mounting a jettisonable store on an aircraft and for releasing the store with ejective force, the combination of: a forward suspension means and an aft suspension means both unitary with said store; a forward engagement means and an aft engagement means on said aircraft operable to releasably engage said forward and aft suspension means respectively; a forward fluid pressure-actuated ejector and an aft fluid pressure-actuated ejector to exert ejective force against said store at forward and aft points respectively to thrust the store away from the aircraft; means to create actuating fluid pressure in both said ejectors; and means responsive to the fluid pressure in both said ejectors to release both of said engagement means only when both of the ejectors operate.

2. A combination as set forth in claim 1 in which said responsive means comprises: means to release both of said engagement means in response to the fluid pressure in one of said two ejectors; and latch means to prevent release operation of both of said two engagement means, said latch means being responsive to the fluid pressure in the other of the two ejectors for release when said other ejector is operated.

3. A combination as set forth in claim 2 in which both of said ejectors are fluid-pressure-actuated ejector guns; and in which said two responsive means are actuated by the fluid pressures generated in the two guns respectively.

4. A combination as set forth in claim 2 in which said two engagement means are operatively interconnected to form a single engagement mechanism; and in which said latch means is spring-biased towards its effective position and has a cam surface in the path of movement of a portion of said mechanism whereby the latch means yields to avoid interference with the movement of said mechanism to its effective engagement position and automatically latches the mechanism in response to said movement.

5. A combination as set forth in claim 2 in which: said two engagement means comprise two spaced pairs of jaws movable between open positions and closed positions for releasable engagement with said two suspension means respectively, each of said pairs of jaws having a pair of arms unitary therewith, said arms being movable towards each other to open said jaws; in which two primary pairs of toggle links are connected to said pairs of jaws respectively, each of said primary pairs of toggle links having a primary central pivot interconnecting the inner ends of the links, the outer end of the links of each pair being connected to the corresponding pair of arms of the corresponding pair of jaws; which includes a secondary pair of toggle links associated with each of said primary pairs, the outer end of one secondary link being connected to the primary central pivot of the corresponding primary pair, the outer end of the other secondary link being connected to a fixed pivot; in which interconnecting means extends between said two secondary pairs of toggle links for release operation thereof in unison; and in which said latch means normally releasably holds said two secondary toggle links against release operation.

6. A mechanism for use on an airborne vehicle to releasably engage a shackle of a jettisonable store, comprising in combination: a pair of jaws rotatable about a corresponding pair of spaced axes between an open position of the jaws and a closed position in engagement with said shackle; a pair of operating arms unitary with said jaws respectively and positioned thereon to provide a space between the two arms when the jaws are closed, said arms being movable towards each other to open the jaws; a primary pair of toggle links having a primary central pivot interconnecting the inner ends of the links with the outer ends of the links connected to said two arms respectively; a secondary pair of toggle links having the outer end of one link connected to said primary central pivot and the outer end of the other link connected to a fixed pivot; stop means for said secondary pair of toggle links, both of said pairs being in expanded state when said jaws are closed with said primary pair thrusting against said secondary pair and with said secondary pair thrusting against said stop means; and actuating means movably mounted in said mechanism to force said second pair away from said stop and past center to cause both pairs to collapse thereby to cause said jaws to open.

7. A combination as set forth in claim 6 which includes a fluid-pressure-actuated ejector to thrust said store away from the airborne vehicle; and in which said actuating means for forcing said secondary pair of links away from said stop is energized by the pressure rise in said ejector.

8. In a mechanism for use on an airborne vehicle for releasably engaging a jettisonable store at two spaced points thereof and for applying ejective force against the store, the combination of: two spaced pairs of jaws movable between open positions and closed positions for releasable engagement with said store at two spaced points thereof, each of said pairs of jaws having a pair of arms unitary therewith, said arms being movable towards each other to open said jaws; two primary pairs of toggle links connected to said two pairs of jaws respectively, each of said primary pairs of toggle links having a primary central pivot interconnecting the inner ends of the links, the outer ends of the links of each pair being connected to the corresponding pair of arms of the corresponding pair of jaws; a secondary pair of toggle links associated with each of said primary pairs, the outer end of one secondary link being connected to the primary central pivot of the corresponding primary pair, the outer end of the other secondary link being connected to a fixed pivot; interconnecting means extending between said two secondary pairs of toggle links for release operation in unison; stop means for the interconnected secondary pairs of toggle links, both of the two pairs of toggle links associated with each of said pairs of jaws being in expanded state when the pair of jaws is closed with the primary pair of toggle links thrusting against the secondary pair of toggle links and with the secondary pair of toggle links thrusting against said stop; two separate fluid-pressure-actuated ejectors to apply ejective force against said store at two spaced points thereof; means to create actuating fluid pressure in said two ejectors; and means responsive to the fluid-pressure in both of said ejectors to force both of said secondary pairs of links past center away from their stopped positions only when both of the ejectors operate.

9. A combination as set forth in claim 8 which includes means to move both said secondary pairs of toggle links away from their stopped positions in response to operation of one of the ejectors; and includes latch means to prevent movement of both of the secondary pairs of toggle links away from their stopped positions, said latch means being releasable in response to operation of the other ejector.

10. A combination as set forth in claim 8 which includes spring means to move both of said secondary pairs of toggle links away from their stopped positions; and includes two separate and independent latches each effective to prevent movement of both secondary pairs of toggle links away from their stopped positions, one of said latches being releasable in response to operation of one of the ejectors and the other being releasable in response to operation of the other ejector.

11. A mechanism for use on an airborne vehicle to releasably engage a shackle of a jettisonable store, comprising in combination; a pair of jaws rotatable about a pair of spaced axes between open positions and closed positions for releasable engagement with said shackle, said jaws having fingers to close the jaws in response to pressure contact with the shackle; a pair of operating arms unitary with said jaws respectively and positioned to provide a space between the two arms when the jaws are closed; said arms being movable towards each other to open the jaws; a primary pair of toggle links having a primary central pivot interconnecting the inner ends of the links with the outer ends of the links connected to said two arms respectively; a secondary pair of toggle links having a secondary central pivot interconnecting the inner ends thereof, the outer end of one secondary link being connected to said primary central pivot, the outer end of the other secondary link being connected to a fixed pivot, said primary toggle links having a normal expanded position thrusting against said secondary toggle links when said jaws are closed, said secondary toggle links also having a normal expanded position when the jaws are closed; actuating means movably mounted in said mechanism to exert force to collapse said secondary pair of toggle links thereby to collapse said primary pair to open said jaws; and latch means to releasably maintain said secondary pair of toggle links in normal expanded position whereby release operation of said latch means permits said actuating means to open said jaws.

12. A combination as set forth in claim 11 in which at said normal expanded position of said secondary pair of toggle links, said secondary central pivot is past center in the direction opposite to the direction of the force of said actuating means; and which includes stop means to prevent collapse of the secondary pair of toggle links in said direction opposite the direction of the actuating force whereby the thrust of said primary pair of toggle links at the closed position of the jaws is against said stop and away from the direction of said actuating force.

13. In a mechanism for use on an aircraft to releasably engage a shackle of a jettisonable store, the combination of: a pair of jaws rotatable about corresponding spaced axes between open positions and closed positions for releasable engagement with said shackle, said jaws having fingers to close the jaws in response to pressure contact with the shackle; a pair of operating arms unitary with said jaws respectively and positioned thereon for movement towards each other to open the jaws; a primary pair of toggle links having a primary central pivot interconnecting the inner ends of the links, the outer ends of the links being connected to said two arms respectively; a secondary pair of toggle links having the outer end of one link connected to said primary central pivot and the outer end of the other link connected to a fixed pivot, said primary pair of toggle links having a normal expanded position thrusting against said secondary toggle links when said jaws are closed, said secondary toggle links also having a normal expanded position when the jaws are closed; a release member mounted in said mechanism and movable from a normal position to a release position to collapse said secondary pair of toggle links thereby to open said jaws; spring means to actuate said release member; and latch means to releasably hold said release member in its normal position whereby release operation of the latch means causes the jaws to open, said release member being movable from its release position to its normal position independently of said secondary pair of toggle links whereby, with said jaws open, said release member may be moved to its normal position in opposition to said spring means for engagement by said latch means and then said shackle may be inserted into said jaws against said fingers thereby to close the jaws and return both pairs of toggle links to their normal positions.

14. A combination as set forth in claim 13 in which said latch means is movably mounted in the path of movement of said release member to the normal position of the release member for automatic engagement with the release member when the release member is moved to its normal position.

15. A combination as set forth in claim 13 in which said release member rotates about the axis of said fixed pivot.

16. In a mechanism for use on an airborne vehicle for releasably engaging a jettisonable store at two spaced points thereof and for applying ejective force against the store, the combination of: two spaced pairs of jaws movable between open positions and closed positions for releasable engagement with said store at two spaced points thereof, each of said pairs of jaws having a pair of arms unitary therewith, said arms being movable towards each other to open said jaws; two primary pairs of toggle links connected to said two pairs of jaws respectively, each of said primary pairs of toggle links having a primary central pivot interconnecting the inner ends of the links, the outer ends of the links of each pair being connected to the corresponding pair of arms of the corresponding pair of jaws; a secondary pair of toggle links associated with each of said primary pairs, the outer end of one secondary link being connected to the primary central pivot of the corresponding primary pair, the outer end of the other secondary link being connected to a fixed pivot; interconnecting means extending between said two secondary pairs of toggle links for release operation thereof in unison; two separate ejectors to apply force to said store at two spaced points thereof; spring means to actuate said two secondary pairs of toggle links to open said two pairs of jaws; and two separate and independent latch means, each effective to prevent opening of both of the pairs of jaws, one of said latch means being releasable in response to operation of one of said ejectors and the other of said latch means being releasable in response to the other of said ejectors whereby both ejectors must operate to permit said spring means to open the two pairs of jaws.

References Cited in the file of this patent

UNITED STATES PATENTS

| | | |
|---|---|---|
| 1,008,724 | Lenderman | Nov. 14, 1911 |
| 2,466,980 | Bronson | Apr. 12, 1949 |
| 2,699,908 | Fletcher | Jan. 18, 1955 |
| 2,736,599 | Coffing | Feb. 28, 1956 |
| 2,749,063 | Low | June 5, 1956 |

FOREIGN PATENTS

| | | |
|---|---|---|
| 328,662 | Great Britain | May 5, 1930 |